(12) United States Patent
Jagota (10) Patent No.: US 11,163,740 B2
(45) Date of Patent: Nov. 2, 2021

(54) MACHINE-LEARNT FIELD-SPECIFIC TOKENIZATION

(71) Applicant: salesforce.com, inc., San Francisco, CA (US)

(72) Inventor: Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 275 days.

(21) Appl. No.: 16/525,945

(22) Filed: Jul. 30, 2019

(65) Prior Publication Data
US 2021/0034596 A1 Feb. 4, 2021

(51) Int. Cl.
| G06F 16/30 | (2019.01) |
| G06F 16/22 | (2019.01) |
| G06F 16/28 | (2019.01) |
| G06N 20/00 | (2019.01) |

(52) U.S. Cl.
CPC ........ G06F 16/2272 (2019.01); G06F 16/285 (2019.01); G06N 20/00 (2019.01)

(58) Field of Classification Search
CPC .......................... G06F 16/2272; G06F 16/285
USPC ........ 707/609, 687, 705, 769, 790, 813, 821
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |

(Continued)

*Primary Examiner* — Sana A Al-Hashemi
(74) *Attorney, Agent, or Firm* — Dergosits & Noah LLP; Todd A. Noah (57) ABSTRACT

A training set is created via creating adjacent classified substrings by using character classes to replace corresponding characters in adjacent substrings in each training character string, and associating each pair of adjacent classified substrings and each pair of adjacent substrings with corresponding labels indicating whether corresponding pairs include any token boundary. The system splits input character string into beginning and ending parts and creates classified beginning part by replacing beginning part character with corresponding class and classified ending part by replacing ending part character with corresponding class. The machine-learning model determines probability of token identification, based on training set to determine count of instances that classified beginning part is paired with classified ending part and count of corresponding labels that indicate inclusion of any token boundary. If token identification probability satisfies threshold, the system identifies beginning part as token and ending part as remainder of input character string.

20 Claims, 4 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,938,053 B2 * | 8/2005 | Jaro .................. G06F 16/353 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0137636 A1* | 6/2011 | Srihari .................. G06F 40/53 704/2 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2020/0073650 A1* | 3/2020 | Peschansky ............ H04L 67/32 |
| 2020/0097562 A1* | 3/2020 | Addala ................ G06F 40/106 |
| 2020/0159917 A1* | 5/2020 | Cervantez .............. G06N 5/025 |

* cited by examiner

MACHINE-LEARNT FIELD-SPECIFIC TOKENIZATION

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications.

The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively. A multi-tenant database can create tens of millions of master profiles for each of hundreds of thousands of tenants.

The process of constructing master profiles involves matching person records, followed by aggregating (which may be referred to as clustering) sets of records as being for the same person, and finally by resolving (which may be referred to as merging) any found duplicate record sets. Matching, aggregating, and resolving are complex processes. Accurate tokenization of records' field values is important for high-quality fuzzy matching and also for resolving record sets. Tokenization can be the process of demarcating and possibly classifying sections of a string of input characters, such that the resulting tokens can be passed on to some other form of processing. Accurate tokenization is also necessary for standardizing the various values of the record fields in the master profile for display purposes, which is especially important when accommodating data from various sources, such as other countries and languages.

In some use cases, the tokens in a record field's string need to be treated differently. For example, when matching United States zip codes, a database system may match on only the first 5 digits of a zip code. Therefore, the database system would need to tokenize a 9-digit zip code into a token that includes the first 5 digits of the zip code and another token that includes the last 4 digits of the zip code so that the database system's matching process can ignore the token that includes the last 4 digits. In some other countries, the requisite tokenization of postal codes for accurate fuzzy matching may be different. The database system may standardize the format of a US zip code as the first 5 digits of the zip code, followed by a hyphen, followed by the last 4 digits of the zip code. Meeting this requirement involves the database system suitably tokenizing a non-standard US zip code, such as a zip code which has 9 digits but no hyphen, and then standardizing this token sequence.

Table 1 below depicts examples of various tokenization scenarios, in which the tokens are separated by a blank.

| Character string | Tokenized sequence | Note |
| --- | --- | --- |
| jsmith@xyz.com | jsmith @ xyz . com | "@" and "." are used as token separators for an email address |
| abc123 | abc 123 | An alphanumeric string is split into alpha and numeric tokens |
| TokenizeAtCaseChanges | Tokenize At Case Changes | Upper-case and lower-case characters |
| Oxymoron | ox y mor on | A word is tokenized into syllables |

In the email address scenario, the database system retains the token separators as tokens, such that no information from the character string is lost. The email address scenario arises in parsing, matching, and standardizing of email fields. The alphanumeric scenario arises in parsing, matching, and standardizing of unit numbers in street addresses. The syllable scenario arises in phonetic matching of person names.

One popular tokenization method is to define a suitable set of token separators that can induce a database system to split a character string into tokens separated by these token separators. Examples of token separators include one or more contiguous blanks or tab delimiters, and one or more commas. This tokenization method is effective for the email address scenario in Table 1, but not for any of the other Table 1 scenarios because their character strings do not include any explicit token separators.

In a standard character classes method, the universe of characters is partitioned into suitable character classes. Some character classes (if not all) are designated as tokens, while other character classes (if any) are designated as token separators. Token boundaries are marked by character class transitions. This character classes method is effective for the email address and the alphanumeric scenario in Table 1. The character classes for the email address scenario are alpha characters and token separators, and the character classes for the alphanumeric scenario are alpha characters and digit characters.

If in the alphanumeric scenario, U denoted the upper-case character class and L denoted the lower-case character class, then token boundaries would occur at L-U transitions from the lower-case character class to the upper-case character class, but token boundaries would not occur at U-L transitions from the upper-case character class to the lower-case character class. However, to handle this scenario, any character-class based algorithm would need further refinement, which would require a human to specify which character class transitions demarcate token boundaries and which character class transitions do not demarcate token boundaries, thereby making such a character-class based algorithm less generic and dependent on human intervention. In the syllable tokenization scenario, the problem of tokenizing a word into its syllables, or syllabication, is very intricate. In many cases, this needs a human to identify specific sequences of characters to the left of the token boundary and specific sequences of characters to the right of the token boundary.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1 A-B are an operational flow diagram illustrating a high-level overview of a method for machine-learnt field-specific tokenization, in an embodiment;

DETAILED DESCRIPTION

General Overview

In accordance with embodiments described herein, there are provided methods and systems for machine-learnt field-specific tokenization. A system creates a training set via creating pairs of adjacent classified substrings by using character classes to replace corresponding characters in pairs of adjacent substrings in each training character string, and associating each pair of adjacent classified substrings and each pair of adjacent substrings with a corresponding label that indicates whether the corresponding pair includes any token boundary. The system splits an input character string into the input character string's beginning part and ending part. The system creates at least one classified beginning part by replacing at least one character in the beginning part with at least one corresponding class and at least one classified ending part by replacing at least one character in the ending part with at least one corresponding class. The machine-learning model determines at least one probability of token identification, which is based on using the training set to determine the count of instances that any of the at least one classified beginning part is paired with any of the at least one classified ending part and the count of corresponding labels that indicate inclusion of any token boundary. If the maximum probability of token identification satisfies a threshold, the system identifies the beginning part as a token and the ending part as the remainder of the input character string.

For example, a machine-learning framework begins creating a training set based on the training character string "5McCoySt." that has been split into pairs of adjacent substrings "5" and "McCoy", "McCoy" and "St.", replaces characters by their classes to create the blurred pairs "D" and "ULULL", "ULULL" and "UL.", and labels each of these pairs with the label "yes." These adjacent substrings also have their own substrings "M" and "cCoy", "Mc" and "Coy", "McC" and "oy", "McCo" and "y", "S" and "t.", and "St" and ".", and the machine-learning framework replaces these characters by their classes to create the blurred pairs "U" and "LULL", "UL" and "ULL", "ULU" and "LL", "ULUL" and "L", "U" and "L.", and "U L" and ".", and labels each of these pairs with the label "no." Creating the training set is also based on the training character string "1MaryAve." that has been split into pairs of adjacent substrings "1" and "Mary", "Mary" and "Ave.", replacing characters by their classes to create the blurred pairs "D" and "ULLL", "ULLL" and "ULL.", and labeling each of these pairs with the label "yes." These adjacent substrings also have their own substrings "M" and "ary", "Ma" and "ry", "Mar" and "y", "A" and "ve.", "Av" and "e.", and "Ave" and ".", and the machine-learning framework replaces characters by their classes to create the blurred pairs "U" and "LLL", "UL" and "LL", "ULL" and "L", "U" and "LL.", "UL" and "L.", and "ULL" and ".", and labels each of these pairs with the label "no." After splitting the production string "9McDonaldAve." into "9" and "McDonaldAve." and identifying "9" as a token (which is later used for a customer record's street address field), the customer resolution engine subsequently splits "McDonaldAve." into "Mc" and "DonaldAve." The customer resolution engine replaces "Mc" with blurrings such as "UL" and "A", and replaces "DonaldAve." with blurrings such as "ULLLLLULL." and "A.". The machine-learning model uses the training set to calculate the probability of 91% that "Mc" is a token based on the machine-learning model's count of instances that "UL" is paired with "U" (a truncated version of "ULLLLLULL.") and the count of corresponding "yes" labels.

The machine-learning model also uses the training set to calculate the probability of 95% that "Mc" is not a token based on the machine-learning model's count of instances that "Uc" (a blurred version of "Mc" that is a more complete match for "Mc") is paired with "D" (a truncated and blurred version of "DonaldAve." that is a more complete match for "DonaldAve.") and the count of corresponding "no" labels.

Since the probability of 95% for no token identification is the probability that expresses the greatest confidence, the customer resolution engine does not identify "Mc" as a token. Instead, the customer resolution engine continues splitting "McDonaldAve." into substrings and calculating their probabilities until "McDonald" and "Ave." are identified as tokens, which are later used for a customer record's street address field.

If the standard character classes method had been used, a rule would have determined that "Mc" is a token because token boundaries always occur at L-U transitions from the lower-case character class to the upper-case character class. However, the machine-learning model did not identify "Mc" as a token based on learning that the training character substring "McCoy" is not divided into tokens.

Systems and methods are provided for machine-learnt field-specific tokenization. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a method for machine-learnt field-specific tokenization. Next, systems for machine-learnt field-specific tokenization will be described with reference to example embodiments.

While one or more implementations and techniques are described with reference to an embodiment in which machine-learnt field-specific tokenization is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A machine-learning tokenization algorithm learns to tokenize from a collection of tokenized sequences. The tokenization behaviors may adjust over time as requirements evolve, get refined, or get adjusted, by simply changing the training sets suitably. The tokenized sequences for the Table 1 scenarios are depicted below in Table 2.

TABLE 2

Four sets of tokenized sequences; one per scenario.

| Email address scenario | Alphanumeric scenario | Case scenario | Syllable scenario |
| --- | --- | --- | --- |
| jsmith @ xyz . com | abc 123 | Tokenize At Case Changes | ox y mor on |

Such machine-learning may be formulated as a binary classification problem. Two strings u and V may have their pair u|v labeled as yes if the token boundary is at '|' and have their pair u|v labeled as no if the token boundary is not at '|'.

Training instances for this binary classification problem may be easily derived from the tokenized sequences. Each pair of adjacent tokens (u, v)=u|v is made a yes instance, and each split (u, v)=u|v that is internal to a token is made a no instance. Below is the training set for the alphanumeric scenario.

{abc|123}→yes
{a|bc, ab|c, 1|23, 12β}→no

The following is a description of how the learned binary classifier tokenizes a string.

```
// c is an algorithm parameter
Tokenize (S: String)
        (first_token, rest_of_S) = FindFirstTokenBoundary (S, c)
        return <first_token, Tokenize (rest_of_S)>
end
FindFirstTokenBoundary (S, c)
        Find the left-most split u|v of S predicted as yes with a
        confidence at least c.
        If no such split is found, raise Exception "Tokenization Error"
        return u|v
End
```

In principle, any public domain algorithm that fits this binary classifier problem can learn from a training set. Leanings from the two training instances of the alphanumeric scenario abc|123 labeled yes and a|bc labeled no include the learning that a transition from an alpha character A to a digit character D is labelled yes because the A|D transition demarcates a token boundary, and the learning that a transition from an alpha character A to a separator | and then to another alpha character A is labelled no because the A|A transition does not demarcate a token boundary. The machine-learning binary classifier is based on the concept of blurring, because A|D may be considered as a blurred version of abc|123 and A|A may be considered as a blurred version of a|bc. These blurred versions are derived from the original training instances by applying two blurring operations in sequence: First, the left context is truncated to the last character before the separator and the right context is truncated to the first character after the separator. Next, the last character before the separator is blurred as A (for alpha) in both training instances and the first character after the separator is blurred as D (for digit) in the first training instance and blurred as A in the second training instance. The steps in this blurring process is depicted below.

abc|123→c|1→A|D→yes

In general, multiple blurrings $u_b|v_b$ may be derived from any one pair u|v. Additionally, u|v→yes may be considered as another labeled training instance. The same label yes may be assigned to each of the blurrings $u_b|v_b$ that are derived from u|v. This process may be applied to all of the training instances in the original training set, resulting in a new data set, the blurred training set, which may contain the original instances. The machine-learning binary classifier trains on the blurred training set.

| Original training set | Blurred training set |
|---|---|
| abc\|123→ yes | A\|D → yes |
| {a\|bc, ab\|c, 1\|23, 12\|3 → no | {A\|A, A\|A, D\|D, D\|D} → no |

The learned model is a collection of $(z, n_z(1), n_z(2), \ldots n_z(k))$ tuples, where z denotes some input that occurs in the blurred training set, and $n_z(i)$ denotes the number of instances of this z that are labeled with 1. Such a tuple merely summarizes the counts of the various labels seen in the training set paired with z. The learned model from the blurred training set in Table 3 is:

(A|D, 1, yes (1))

(A|A, 2, no (2))

(D|D, 2, no (2))

The first tuple denotes that the blurring A|D appears once in the blurred training set, labeled yes. The second tuple denotes that the blurring A|A appears twice in the blurred training set, in both cases labeled no. The third tuple denotes that the blurring D|D appears twice in the blurred training set, in both cases labeled no.

The binary classifier receives an input u|v to predict a label, yes or no, with a confidence attached. First, the binary classifier identifies all of the blurrings of u|v, identifies the pair of blurrings that predicts a label with the highest confidence, and returns this label as the prediction and the highest confidence as the confidence in this prediction.

For the tuple $(z, n_z(1), n_z(2), \ldots n_z(k))$, the confidence with which the label for z is i may be defined as a Bayesian-adjusted precision of label i. In more detail, a pseudo-count c, which is a free parameter, may be associated with each label i., such that the confidence formula may become:

$$(c+n_z(i))/(k*c+\Sigma j n_z(j))$$ (Equation 1)

Example calculations using the confidence formula depicted above by Equation 1 are described below in reference to block 110 of the method 100 for machine-learnt field-specific tokenization.

A set of blurring operators may be designed that collectively covers the first three scenarios from Table 1. The syllable scenario will be treated separately because it is far more difficult.

TABLE 4

The tokenized sequences in the first three scenarios of Table 1

| Email address scenario | Alphanumeric scenario | Case scenario |
|---|---|---|
| jsmith @ xyz . com | abc 123 | Tokenize At Case Changes |

The steps in the blurring process described above are refined as follows. First, the left context is truncated to the last character before the separator and the right context is truncated to the first character after the separator. Next, the last character before the separator is blurred as A (for alpha) in which both training instances and the first character after the separator is blurred as D (for digit) in the first training instance and as A in the second training instance. The refinement specifies that if the last character before the separator or the first character after the separator is neither an alpha nor a digit, this character is left unblurred.

TABLE 5

The original and the blurred training sets for the first two scenarios in Table 1

| Original training set | Blurred training set |
|---|---|
| {jsmith\|@, @\|xyz, xyz\|., .\|com} → yes | {A\|@, @\|A, A\|., .\|A} → yes |
| {j\|smith, js\|mith, . . . c\|om, co\|m . . . } → no | {A\|A, A\|A, . . . A\|A, A\|A. . . }→ no |
| abc\|123 → yes | A\|D → yes |
| {a\|bc, ab\|c, 1\|23, 12\|3} → no | {A\|A, A\|A, D\|D, D\|D} → no |

Syllabication is a more difficult problem than the first three scenarios. Below are some examples that reveal its various complexities.

The following examples involve adjacent vowels.

cha os, leaf chaos is tokenized between the adjacent vowels because these adjacent vowels make different sounds, but leaf is not tokenized between the adjacent vowels because these adjacent vowels do not make different sounds.

The following examples involve adjacent consonants.

sil ly, let ter, mar ble, plas ma, eas ter

In all these cases, the syllable boundary is between adjacent consonants.

The following examples also involve adjacent consonants.

fath er, rich er, fa shion

In all these cases, the syllable boundary is not between adjacent consonants because these adjacent consonants form a digraph that represents a single sound.

The following examples involve single middle consonants.

pan ic, ti ger

In both cases, the token boundary is "around" the middle consonant, but the token boundary is after the single middle consonant in panic and before the single middle consonant in tiger.

The following examples involve multiple middle consonants.

bub ble, maple, purple

In all cases the second token is a consonant followed by the letters "le."

The following examples also involve multiple middle consonants.

non sense, fast er, hott est, post pone, help less

The boldfaced portions are all bound morphemes.

The following examples involve compound words.

drive way, wall pa per, lamp shade

In no case does a syllable boundary divide the words in a compound word. No syllable cuts across adjacent words. Word boundaries are also syllable boundaries, although there might be additional syllable boundaries.

For any instance u|v→y in the non-blurred training set of the binary classification formulation, blurrings of u|v are generated that remain predictive of y. To generate a set of blurrings $U_b$ from u and a set of blurrings $V_b$ from v, the cartesian product $U_b \times V_b$ can be taken as the set of blurrings of u|v.

The following characteristics emerge from the syllabication examples above. The syllabication of words such as fast er and bub ble indicates that sometimes the split into syllables is based on the full contents of a or V. The syllabication of words such as plas ma and eas ter indicates that often the split into syllables is based on whether a ends with a consonant and V begins with a consonant. The syllabication of words such as cha os and fa shion indicates that sometimes the split into syllables is based on the identities of the last character in a and the first character in V. The syllabication of words such as pa nic and ti ger indicates that sometimes the split into syllables is based on the full contents of suitable prefixes of a or suitable suffixes of V. The blurrings are based on the above characteristics.

$$U_b = \{u, Au_1, \ldots Au_{k-1}\} \quad \text{(Equation 2)}$$

Here $u_i$ denotes the suffix of u a of length i and |u|=k, such that $u=u_1 \ldots u_k$. A≡A+ matches a string of one or more characters. $U_b = \{AC\}$ if |u|≥2 and $u_k$ is a consonant. Here C denotes a consonant.

Similarly, $$V_b = \{v, v_2 A, \ldots v_{l-1} A\} \quad \text{(Equation 3)}$$

Here $v_i$ denotes a prefix of v of length i, and |v|=l. CA is added to $V_b$ if |v|≥2 and $v_1$ is a consonant. So now $U_b \times V_b$ is the blurrings of u|v.

Using cha os as an example, $U_b = \{cha, Aha, Aa\}$, since u ends with a vowel. Similarly, $V_b = \{os, OA\}$. Therefore, $U_b \times V_b = \{cha|oA, cha|os, Aha|oA, Aha|os, Aa|oA, Aa|os\}$ Using sil ly as an example, $U_b = \{sil, Ail, Al, AC\}$ and $V_b = \{ly, 1A, CA\}$. Therefore, $U_b \times V_b = \{sil|ly, sil|1A, sil|CA, Ail|ly, Ail|1A, Ail|CA, Al|ly, Al|1A, Al|CA, AC|ly, AC|1A, AC|CA\}$ Since both cha os and sil ly are labeled yes, their blurred versions also inherit this label yes.

Figure 1A:
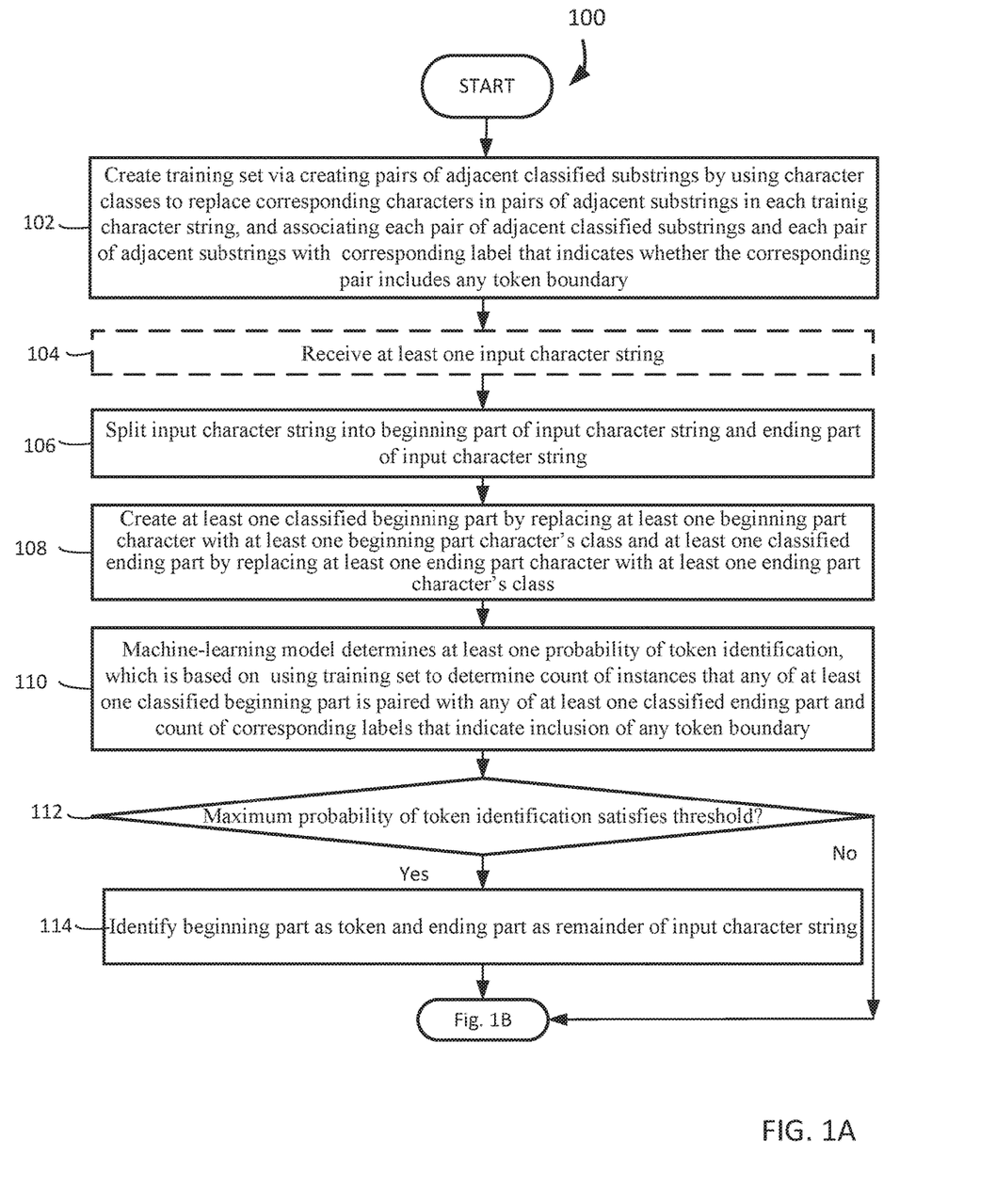
Figure 1B:
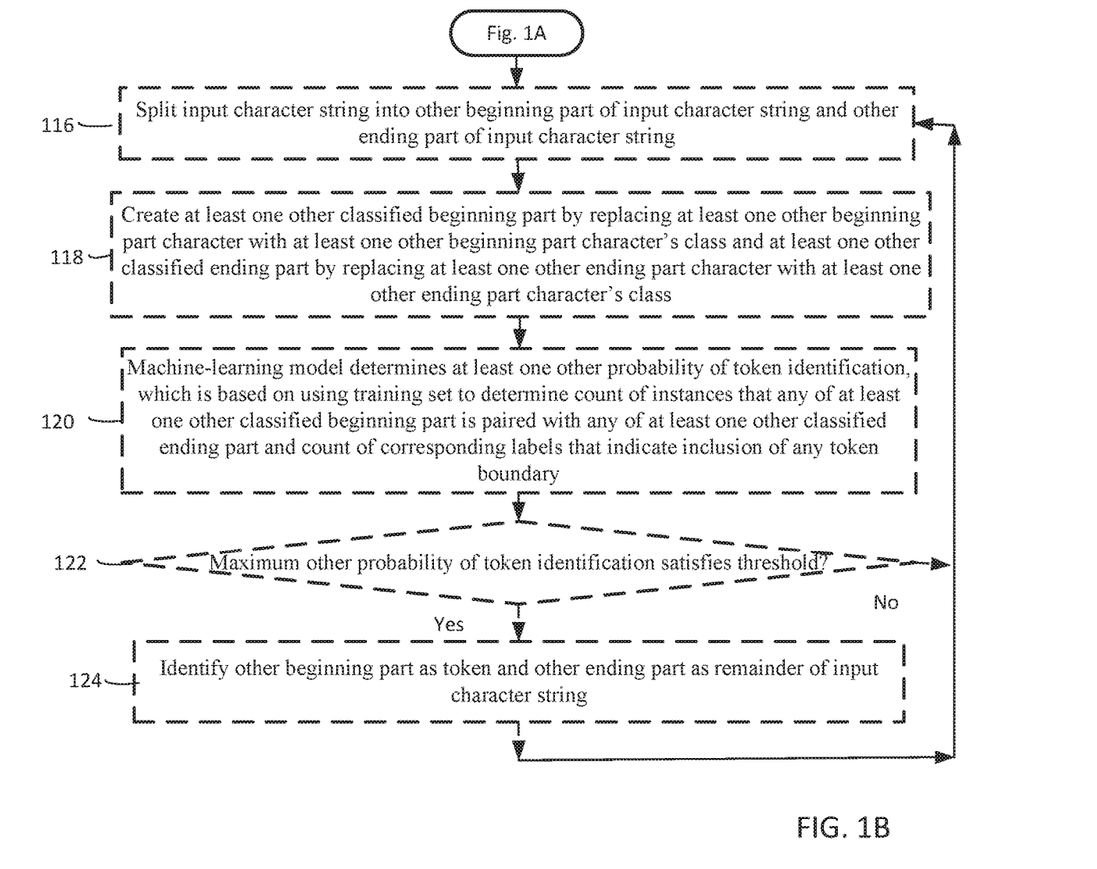

FIGS. 1 A-B are an operational flow diagram illustrating a high-level overview of a method 100 for machine-learnt field-specific tokenization. A system creates a training set via creating pairs of adjacent classified substrings by using character classes to replace corresponding characters in pairs of adjacent substrings, and associating each pair of adjacent classified substrings and each pair of adjacent substrings with a corresponding label that indicates whether the corresponding pair includes any token boundary, block 102. A system uses training character strings to create a training set that a machine-learning model uses to learn how to tokenize character strings for record fields. For example, and without limitation, this can include a machine-learning framework beginning creation of a training set based on the training character string "5McCoySt." that has been split into pairs of adjacent substrings such as "5" and "McCoy", "McCoy" and "St.", replacing characters by their classes to create the blurred pairs "D" and "ULULL", "ULULL" and "UL.", and labeling each of these pairs with the label "yes." These adjacent substrings also have their own substrings "M" and "cCoy", "Mc" and "Coy", "McC" and "oy", "McCo" and "y", "S" and "t.", and "St" and ".", and the machine-learning framework replaces these characters by their classes to create the blurred pairs "U" and "LULL", "UL" and "ULL", "ULU" and "LL", "ULUL" and "L", "U" and "L.", and "UL" and ".", and labels each of these pairs with the label "no." Creating the training set is also based on the training character string "1MaryAve." that has been split into pairs of adjacent substrings "1" and "Mary", "Mary" and "Ave.", replacing characters by their classes to create the blurred pairs "D" and "ULLL", "ULLL" and "ULL.", and labeling each of these pairs with the label "yes." These adjacent substrings also have their own substrings "M" and "ary", "Ma" and "ry", "Mar" and "y", "A" and "ve.", "Av" and "e.", and "Ave" and ".", and the machine-learning framework replaces characters by their classes to create the blurred pairs "U" and "LLL", "UL" and "LL", "ULL" and "L", "U" and "LL.", "UL" and "L.", and "ULL" and ".", and labels each of these pairs with the label "no."

A training set can be a group of things that resemble one another and are used to teach a particular type of behavior through practice and instruction over a period of time. A machine-learning model can be a computer system that scientifically studies algorithms and/or statistical models to perform a specific task effectively by relying on patterns and inference instead of using explicit instructions. A character can be a symbol. A training character string can be sequence of symbols used to teach a particular skill. A pair can be two items. Adjacent substrings can be contiguous parts of a sequence of symbols. Adjacent classified substrings can be categorized contiguous parts of a sequence of symbols. A character class can be a category of a symbol. A label can be a classifying phrase or word applied to a thing. A token boundary can be a divide between linguistic units.

The training set may include a tokenized sequence and a corresponding label that identifies that each two adjacent tokens include any token boundary, for each training character string. For example, the training set includes "jsmith" and "@" with the label "yes." A tokenized sequence can be a collection of linguistic units in a particular order. Adjacent tokens can be contiguous linguistic units.

The character class of a character that excludes classification as an alphabetic character and excludes classification as a numeric character may be classified as the character. For example, the "@" symbol in the character string jsmith@xyz.com" is classified as the "@" class. Classification can be categorization. An alphabetic character can be a symbol relating to a set of letters, such as from A to Z. A numeric character can be a symbol relating to arithmetical values.

After creating a training set, at least one input character string is optionally received, block 104. A customer resolution engine receives character strings to be tokenized for record fields. By way of example and without limitation, this can include the customer resolution engine receiving the production character string "9McDonaldAve." An input character string can be the sequence of symbols that is fed into a computer program.

Following the creation of a training set, an input character string is split into the beginning part of the input character string and the ending part of the input character string, block 106. The customer resolution engine splits a character string to try to identify a token in the character string. In embodiments, this can include the customer resolution engine subsequently splitting "McDonaldAve." into "Mc" and "DonaldAve." after having split the production string "9McDonaldAve." into "9" and "McDonaldAve." and having identified "9" as a token (which is later used for a customer record's street address field). A beginning part can be the first segment of something. An ending part can be the remaining segment of something.

After splitting the input character string into beginning and ending parts, at least one classified beginning part is created by replacing at least one character in the beginning part with at least one corresponding class and at least one classified ending part is created by replacing at least one character in the ending part with at least one corresponding class, block 108. The customer resolution engine creates blurred versions of the input character string's parts. For example, and without limitation, this can include the customer resolution engine replacing "Mc" with blurrings such as "UL", "A", "Uc", "ML", and replacing "DonaldAve." with blurrings such as "ULLLLLULL.", "A.", "UL", and "DL." A classified beginning part can be the categorized first segment of something. A classified ending part can be the categorized remaining segment of something Following the creation of classified parts of the input character string, the machine-learning model determines at least one probability of token identification, which is based on using the training set to determine a count of instances that any of the at least one classified beginning part is paired with any of the at least one classified ending part and a count of corresponding labels that indicate inclusion of any token boundary, block 110. The machine-learning model calculates every probability that the input character string should be divided into tokens between the beginning and ending parts. By way of example and without limitation, this can include the machine-learning model using the training set to calculate the probability of 91% that "Mc" is a token based on the machine-learning model's count of instances that "UL" is paired with "U" (a truncated version of "ULLLL-LULL.") and the count of corresponding "yes" labels. In another example, the machine-learning model uses the training set to calculate the probability of 89% that "Mc" is a token based on the machine-learning model's count of instances that "A" is paired with "A." and the count of corresponding "yes" labels. In yet another example, the machine-learning model also uses the training set to calculate the probability of 95% that "Mc" is not a token based on the machine-learning model's count of instances that "Uc" (a blurred version of "Mc" that is a more complete match for "Mc" than "UL" or "A") is paired with "D" (a truncated and blurred version of "DonaldAve." that is a more complete match for "DonaldAve." than "U" or "A") and the count of corresponding "no" labels. As indicated by this example, since u is paired with v, then every blurring $u_b$ of u is considered to be paired with every blurring $v_b$ of V. A probability can be the likelihood of something being the case. Token identification can be the indication that any set of symbols is a linguistic unit. A count can be a total number of items. An instance can be an occurrence of something.

Determining any probability of token identification may include determining a token boundary count based on adding a pseudo-count to a count of instances that any of the at least one classified beginning part is paired with any of the at least one classified ending part and has a corresponding label that indicates inclusion of any token boundary, determining a total count based on adding another pseudo-count to a count of instances that any of the at least one classified beginning part is paired with any of the at least one classified ending part, and dividing the token boundary count by the total count. A token boundary count can be a total number of items that include a divide between linguistic units. A pseudo count can be an artificial number of items. A total count can be an aggregation of the number of items.

For an example using Equation 1 above, the pseudo-count $c=1$, $k=2$ (values yes and no), $n_z(i)=0$ (the count of training substrings that are blurred as A|A and are assigned the label yes) and $n_z(j)=2$ (the count of training substrings that are blurred as A|A), then the confidence score=$(1+0)/(2*1+2)$ =¼=25%. The machine-learning model does not assign a probability close to 0% for a potential split between tokens just because only two training character strings were not split between the blurred versions of the two substrings being evaluated. If 10 training character strings were not split between the blurred versions of the two substrings being evaluated, then the confidence score=$(1+0)/(2*1+10)$ =$\frac{1}{12}$=8%, as the machine-learning model assigns a probability that is closer to 0% for the potential split between tokens which has not occurred in 10 instances.

In another example, if the pseudo-count $c=1$, $k=2$ (values yes and no), $n_z(i)=1$ (the count of training substrings that are blurred as A|D and are assigned the label yes) and $n_z(j)=1$ (the count of training substrings that are blurred as A|D), then the confidence score=$(1+1)/(2*1+1)$=⅔=67%. The machine-learning model does not assign a probability close to 100% for a potential split between tokens just because a single training character string was split between the blurred versions of the two substrings being evaluated. If 10 training character strings were split between the blurred versions of the two substrings being evaluated, then the confidence score=$(1+10)/(2*1+10)$=$\frac{11}{12}$=92%, as the machine-learning model assigns a probability that is closer to 100% for the potential split between tokens which has always occurred in 10 instances.

Having calculated at least one probability of having identified a token, a determination is made whether a maximum of the at least one probability of token identification satisfies a threshold, block 112. The customer resolution engine determines if the highest calculated probability is sufficient to indicate that a token has been identified. In embodiments, this can include the customer resolution engine determining that the probability of 95% for no token identification is the probability with the greatest confidence. A maximum can be the highest likelihood that was calculated, such that the highest of a single calculated likelihood is the single calculated likelihood. A threshold can be the magnitude that must be met for a certain result to occur. If the maximum probability of token identification satisfies the threshold, the method 100 continues to block 114 to identify the token. If the maximum probability of token identification does not satisfy the threshold, the method 100 proceeds to block 116 to evaluate other adjacent substrings in the input character string.

The threshold may be a specific value, such as 50%, or based on the machine-learning model determining a maximum probability of no token identification, which is based on using the training set to determine the count of labels that do not indicate inclusion of any token boundary and a count of corresponding instances that any of the at least one classified beginning part is paired with any of the at least one classified ending part. For example, the machine-learning model uses the training set to calculate the probability of 95% that "Mc" is not a token based on the machine-learning model's count of instances that "Uc" (a blurred version of "Mc" that is a more complete match for "Mc" than "UL" or "A") is paired with "D" (a truncated/blurred version of "DonaldAve." that is a more complete match for "DonaldAve." than "U" or "A") and the count of corresponding "no" labels.

Since the probability of 95% for no token identification is the maximum probability, which represents the greatest confidence, the customer resolution engine does not identify "Mc" as a token. Instead, the customer resolution engine continues splitting "McDonaldAve." into substrings and calculating their probabilities until "McDonald" and "Ave." are identified as tokens.

If the standard character classes method had been used, a rule would have determined that "Mc" is a token because token boundaries always occur at L-U transitions from the lower-case character class to the upper-case character class. However, the machine-learning model did not identify "Mc" as a token based partially on learning that the training character substring "McCoy" is not divided into tokens.

If the maximum of the at least one probability of token identification satisfies the threshold, the beginning part is identified as a token and the ending part is identified as the remainder of the input character string, block 114. The customer resolution engine identifies a token based on the maximum probability being sufficiently high that a part of the input character string is a token. For example, and without limitation, this can include the customer resolution engine previously having identified "9" as a token (which is later used for a customer record's street address field) and thereby previously having identified "McDonaldAve." as the remainder of the production character string that remains to be tokenized. A remainder can be the part of a character string that is left over when the preceding part has been identified as a token.

If the maximum of the at least one probability of token identification does not satisfy the threshold, the, input character string is optionally split into another beginning part of the input character string and another ending part of the input character string, block 116. The customer resolution engine splits a character string again to try to identify a token in the character string. By way of example and without limitation, this can include the customer resolution engine subsequently splitting the production character string "McDonaldAve." into "McDonald" and "Ave."

After splitting the input character string into the other beginning and ending parts, another classified beginning part is optionally created by replacing at least one other beginning part character with at least one other beginning part character's class and another classified ending part by replacing at least one other ending part character with at least one other ending part character's class, block 118. The customer resolution engine creates other blurred versions of the input character string's other parts. In embodiments, this can include the customer resolution engine replacing "McDonald" with blurrings such as "ULULLLLL", "A", "Ld", "lL", and "L", and replacing "Ave." with blurrings such as "ULL.", "A.", "AL.", "Uv.", and "U.".

Following the creation of the classified versions of the other parts of the input character string, the machine-learning model optionally determines at least one other probability of token identification, which is based on using the training set to determine the count of instances that any of the at least one other classified beginning part is paired with any of the at least one other classified ending part and a count of corresponding labels that indicate inclusion of any token boundary, block 120. The machine-learning model calculates every probability that the input character string should be divided into tokens between the other beginning and ending parts. For example, and without limitation, this can include the machine-learning model using the training set to calculate the probability of 93% that "McDonald" is a token and "Ave." is the remainder of the production character string, based on the machine-learning model's count of instances that "L" is paired with "U." and the count of corresponding "yes" labels.

Having calculated at least one other probability of having identified a token, a determination is optionally made whether the maximum of the at least one other probability of token identification satisfies the threshold, block 122. The customer resolution engine determines if the maximum other calculated probability is high enough to indicate that a token has been identified. In embodiments, this can include the customer resolution engine determining that the probability of 93% for token identification is the probability with the greatest confidence. If the maximum of the other probabilities of token identification satisfies the threshold, the method 100 continues to block 124 to identify the token. If the maximum of the other probabilities of token identification does not satisfy the threshold, the method 100 returns to block 116 to continue the tokenizing process.

If the maximum of the other probabilities of token identification satisfies the threshold, the other beginning part is optionally identified as a token and the other ending part is optionally identified as the remainder of the input character string, block 124. The customer resolution engine identifies a token based on the maximum probability of the other beginning part being a token is sufficiently high. In embodiments, this can include the customer resolution engine identifying "McDonald" as a token (which is later used for a customer record's street address field) and thereby identifying "Ave." as the remainder of the production character string to be tokenized The method 100 may be repeated as desired. Although this disclosure describes the blocks 102-124 executing in a particular order, the blocks 102-124 may be executed in a different order. In other implementations, each of the blocks 102-124 may also be executed in combination with other blocks and/or some blocks may be divided into a different set of blocks.

System Overview

Figure 2:
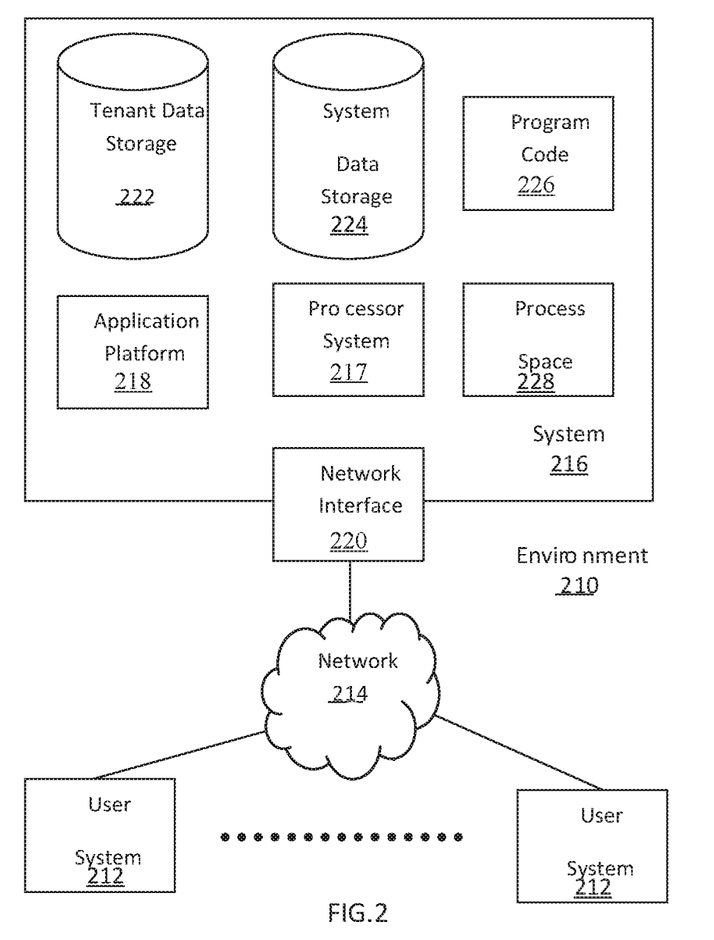
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 3:
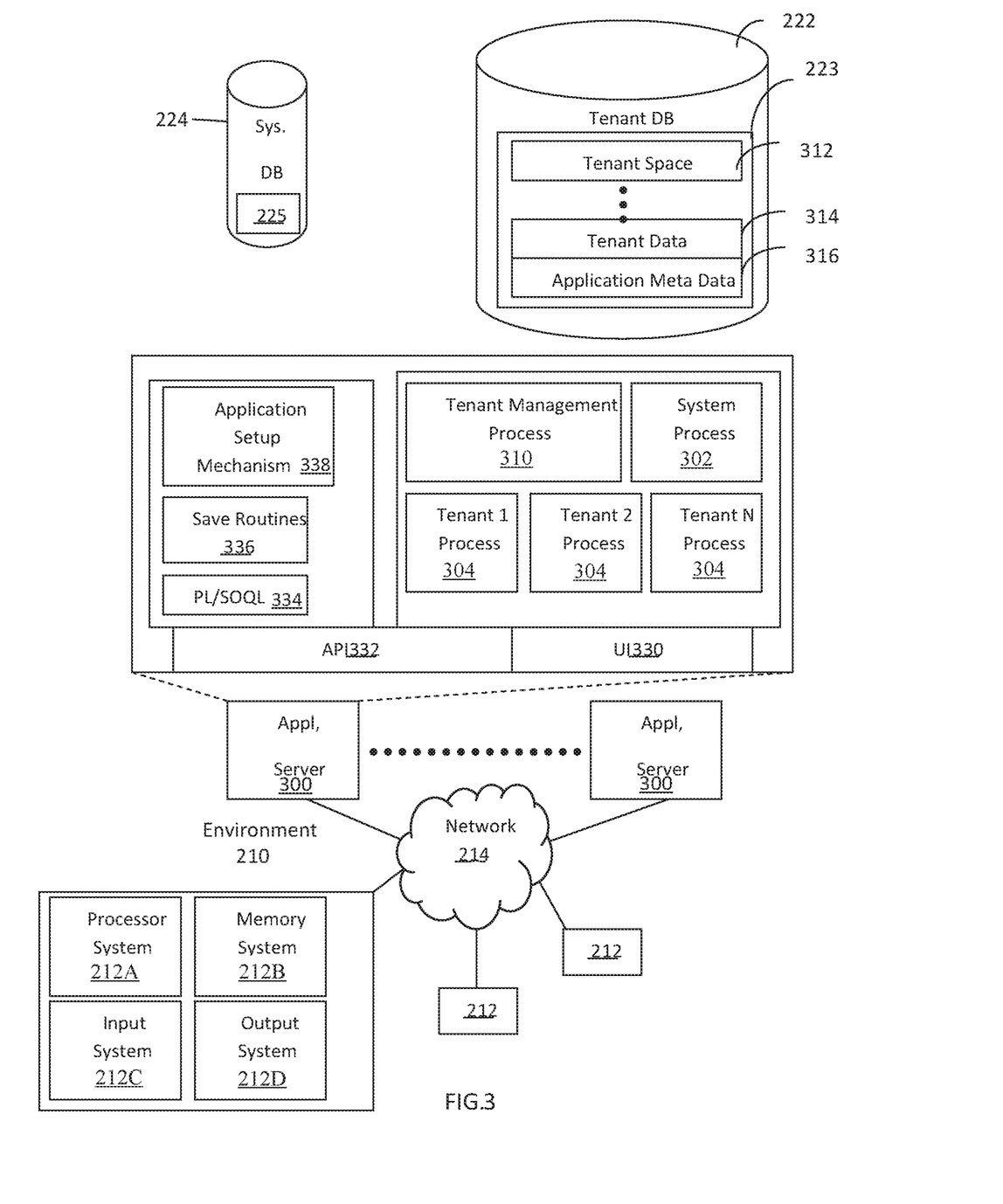
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which may be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes.

Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also may be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for machine-learnt field-specific tokenization, the system comprising:
one or more processors; and
a non-transitory computer readable medium storing a plurality of instructions, which when executed, cause the one or more processors to:
create a training set via creating pairs of adjacent classified substrings by using character classes to replace corresponding characters in pairs of adjacent substrings in each training character string, and associating each pair of adjacent classified substrings and each pair of adjacent substrings with a corresponding label that indicates whether the corresponding pair includes any token boundary;
split an input character string into a beginning part of the input character string and an ending part of the input character string;
create at least one classified beginning part by replacing at least one character in the beginning part with at least one corresponding class and at least one classified ending part by replacing at least one character in the ending part with at least one corresponding class;
determine, by the machine-learning model, at least one probability of token identification, which is based on using the training set to determine a count of instances that any of the at least one classified beginning part is paired with any of the at least one classified ending part and a count of corresponding labels that indicate inclusion of any token boundary;
determine whether a maximum of the at least one probability of token identification satisfies a threshold; and
identify the beginning part as a token and the ending part as a remainder of the input character string, in response to a determination that the maximum of the at least one probability of token identification satisfies the threshold.

2. The system of claim 1, wherein a character class of a character that excludes classification as an alphabetic character and excludes classification as a numeric character is classified as the character.

3. The system of claim 1, wherein creating the training set further comprises a tokenized sequence and a corresponding label that indicates inclusion of any token boundary, for each training character string.

4. The system of claim 1, wherein the plurality of instructions, when executed, will further cause the one or more processors to: receive at least one input character string.

5. The system of claim 1, wherein determining any probability of token identification comprises determining a token boundary count based on adding a pseudo-count to a count of instances that any of the at least one classified beginning part is paired with any of the at least one classified ending part and has a corresponding label that indicates inclusion of any token boundary, determining a total count based on adding another pseudo-count to a count of instances that any of the at least one classified beginning part is paired with any of the at least one classified ending part, and dividing the token boundary count by the total count.

6. The system of claim 1, wherein the threshold is based on the machine-learning model determining at least one probability of lacking token identification, which is based on using the training set to determine a count of labels that lack indication of inclusion of any token boundary and a count of corresponding instances that any of the at least one classified beginning part is paired with any of the at least one classified ending part.

7. The system of claim 1, wherein the plurality of instructions, when executed, will further cause the one or more processors to:
split the input character string into another beginning part of the input character string and another ending part of the input character string; in response to a determination that the maximum of the at least one probability of token identification does not satisfy the threshold;
create at least one other classified beginning part by replacing at least one character in the other beginning part with at least one corresponding class and at least one other classified ending part by replacing at least one character in the other ending part with at least one corresponding class;
determine, by the machine-learning model, at least one other probability of token identification, which is based on using the training set to determine a count of instances that any of the at least one other classified beginning part is paired with any of the at least one other classified ending part and a count of corresponding labels that indicate inclusion of any token boundary;
determine whether a maximum of the at least one other probability of token identification satisfies the threshold; and
identify the other beginning part as the token and the other ending part as the remainder of the input character string, in response to a determination that the maximum of the at least one other probability of token identification satisfies the threshold.

8. A computer program product comprising computer-readable program code to be executed by one or more processors when retrieved from a non-transitory computer-readable medium, the program code including instructions to:
create a training set via creating pairs of adjacent classified substrings by using character classes to replace corresponding characters in pairs of adjacent substrings in each training character string, and associating each pair of adjacent classified substrings and each pair of adjacent substrings with a corresponding label that indicates whether the corresponding pair includes any token boundary;
split an input character string into a beginning part of the input character string and an ending part of the input character string;
create at least one classified beginning part by replacing at least one character in the beginning part with at least one corresponding class and at least one classified ending part by replacing at least one character in the ending part with at least one corresponding class;
determine, by the machine-learning model, at least one probability of token identification, which is based on using the training set to determine a count of instances that any of the at least one classified beginning part is paired with any of the at least one classified ending part and a count of corresponding labels that indicate inclusion of any token boundary;
determine whether a maximum of the at least one probability of token identification satisfies a threshold; and
identify the beginning part as a token and the ending part as a remainder of the input character string, in response to a determination that the maximum of the at least one probability of token identification satisfies the threshold.

9. The computer program product of claim 8, wherein a character class of a character that excludes classification as an alphabetic character and excludes classification as a numeric character is classified as the character.

10. The computer program product of claim 8, wherein the training set further comprises a tokenized sequence and a corresponding label that indicates inclusion of any token boundary, for each training character string.

11. The computer program product of claim 8, wherein the program code further includes instructions to receive at least one input character string.

12. The computer program product of claim 8, wherein determining any probability of token identification comprises determining a token boundary count based on adding a pseudo-count to a count of instances that any of the at least one classified beginning part is paired with any of the at least one classified ending part and has a corresponding label that indicates inclusion of any token boundary, determining a total count based on adding another pseudo-count to a count of instances that any of the at least one classified beginning part is paired with any of the at least one classified ending part, and dividing the token boundary count by the total count.

13. The computer program product of claim 8, wherein the threshold is based on the machine-learning model determining at least one probability of lacking token identification, which is based on using the training set to determine a count of labels that lack indication of inclusion of any token boundary and a count of corresponding instances that any of the at least one classified beginning part is paired with any of the at least one classified ending part.

14. The computer program product of claim 8, wherein the program code further includes instructions to:
split the input character string into another beginning part of the input character string and another ending part of the input character string; in response to a determination that the maximum of the at least one probability of token identification does not satisfy the threshold;
create at least one other classified beginning part by replacing at least one character in the other beginning part with at least one corresponding class and at least one other classified ending part by replacing at least one character in the other ending part with at least one corresponding class;
determine, by the machine-learning model, at least one other probability of token identification, which is based on using the training set to determine a count of instances that any of the at least one other classified beginning part is paired with any of the at least one other classified ending part and a count of corresponding labels that indicate inclusion of any token boundary;
determine whether a maximum of the at least one other probability of token identification satisfies the threshold; and
identify the other beginning part as the token and the other ending part as the remainder of the input character string, in response to a determination that the maximum of the at least one other probability of token identification satisfies the threshold.

15. A method for machine-learnt field-specific tokenization, the method comprising:
creating a training set via creating pairs of adjacent classified substrings by using character classes to replace corresponding characters in pairs of adjacent substrings in each training character string, and associating each pair of adjacent classified substrings and each pair of adjacent substrings with a corresponding label that indicates whether the corresponding pair includes any token boundary;
splitting an input character string into a beginning part of the input character string and an ending part of the input character string;
creating at least one classified beginning part by replacing at least one character in the beginning part with at least one corresponding class and at least one classified ending part by replacing at least one character in the ending part with at least one corresponding class;
determining, by the machine-learning model, at least one probability of token identification, which is based on using the training set to determine a count of instances that any of the at least one classified beginning part is paired with any of the at least one classified ending part and a count of corresponding labels that indicate inclusion of any token boundary;
determining whether a maximum of the at least one probability of token identification satisfies a threshold; and
identifying the beginning part as a token and the ending part as a remainder of the input character string, in response to a determination that the maximum of the at least one probability of token identification satisfies the threshold.

16. The method of claim 15, wherein a character class of a character that excludes classification as an alphabetic character and excludes classification as a numeric character is classified as the character.

17. The method of claim 15, wherein creating the training set further comprises a tokenized sequence and a corresponding label that indicates inclusion of any token boundary, for each training character string.

18. The method of claim 15, wherein the method further comprises receiving at least one input character string.

19. The method of claim 15, wherein determining any probability of token identification comprises determining a token boundary count based on adding a pseudo-count to a count of instances that any of the at least one classified beginning part is paired with any of the at least one classified ending part and has a corresponding label that indicates inclusion of any token boundary, determining a total count based on adding another pseudo-count to a count of instances that any of the at least one classified beginning part is paired with any of the at least one classified ending part, and dividing the token boundary count by the total count, and wherein the threshold is based on the machine-learning model determining at least one probability of lacking token identification, which is based on using the training set to determine a count of labels that lack indication of inclusion of any token boundary and a count of corresponding instances that any of the at least one classified beginning part is paired with any of the at least one classified ending part.

20. The method of claim 15, wherein the method further comprises:
splitting the input character string into another beginning part of the input character string and another ending part of the input character string, in response to a determination that the maximum of the at least one probability of token identification does not satisfy the threshold;
creating at least one other classified beginning part by replacing at least one character in the other beginning part with at least one corresponding class and at least one other classified ending part by replacing at least one character in the other ending part with at least one corresponding class;

determining, by the machine-learning model, at least one other probability of token identification, which is based on using the training set to determine a count of instances that any of the at least one other classified beginning part is paired with any of the at least one other classified ending part and a count of corresponding labels that indicate inclusion of any token boundary;

determining whether a maximum of the at least one other probability of token identification satisfies the threshold; and identifying the other beginning part as the token and the other ending part as the remainder of the input character string, in response to a determination that the maximum of the at least one other probability of token identification satisfies the threshold.

\* \* \* \* \*